United States Patent [19]

Appel

[11] 3,827,118

[45] Aug. 6, 1974

[54] AIRFOIL AND METHOD OF FORMING THE SAME

[75] Inventor: Gerhard H. Appel, Redondo Beach, Calif.

[73] Assignee: The Garrett Corporation, Los Angeles, Calif.

[22] Filed: July 17, 1972

[21] Appl. No.: 272,502

Related U.S. Application Data

[62] Division of Ser. No. 93,095, Nov. 27, 1970, abandoned.

[52] U.S. Cl............. 29/156.8 B, 416/230, 156/198
[51] Int. Cl.......................... B21k 3/04, B23p 15/04
[58] Field of Search.. 29/156.8 T, 156.8 B, 156.8 P, 29/419; 416/229, 230, 241 A; 156/166, 198, 293, 294

[56] References Cited
UNITED STATES PATENTS

| 2,175,204 | 10/1939 | Lougheed | 29/156.8 P |
| 2,182,812 | 12/1939 | Lougheed | 416/230 |
| 2,428,970 | 10/1947 | Hardy | 416/229 |
| 2,648,388 | 8/1953 | Haines et al | 29/156.8 P |
| 2,929,755 | 3/1960 | Porter | 416/230 |
| 2,958,505 | 11/1960 | Frank | 416/230 |
| 3,572,971 | 3/1971 | Seiwert | 416/230 |
| 3,632,460 | 1/1972 | Palfreyman | 156/173 |
| 3,667,108 | 6/1972 | Schmidt | 29/156.8 B |
| 3,699,623 | 10/1972 | Kreider | 29/156.8 B |

Primary Examiner—Charles W. Lanham
Assistant Examiner—D. C. Crane
Attorney, Agent, or Firm—Herschel C. Omohundro; Jack D. Puffer; Albert J. Miller

[57] ABSTRACT

An airfoil and method for its forming, the airfoil having a foreign object damage and erosion resistant outer skin or shell and an inner body composed of resin-impregnated fiber with high fiber to resin content, the resin being cured during the application of the skin to the inner body to provide an integrally bonded unit.

9 Claims, 8 Drawing Figures

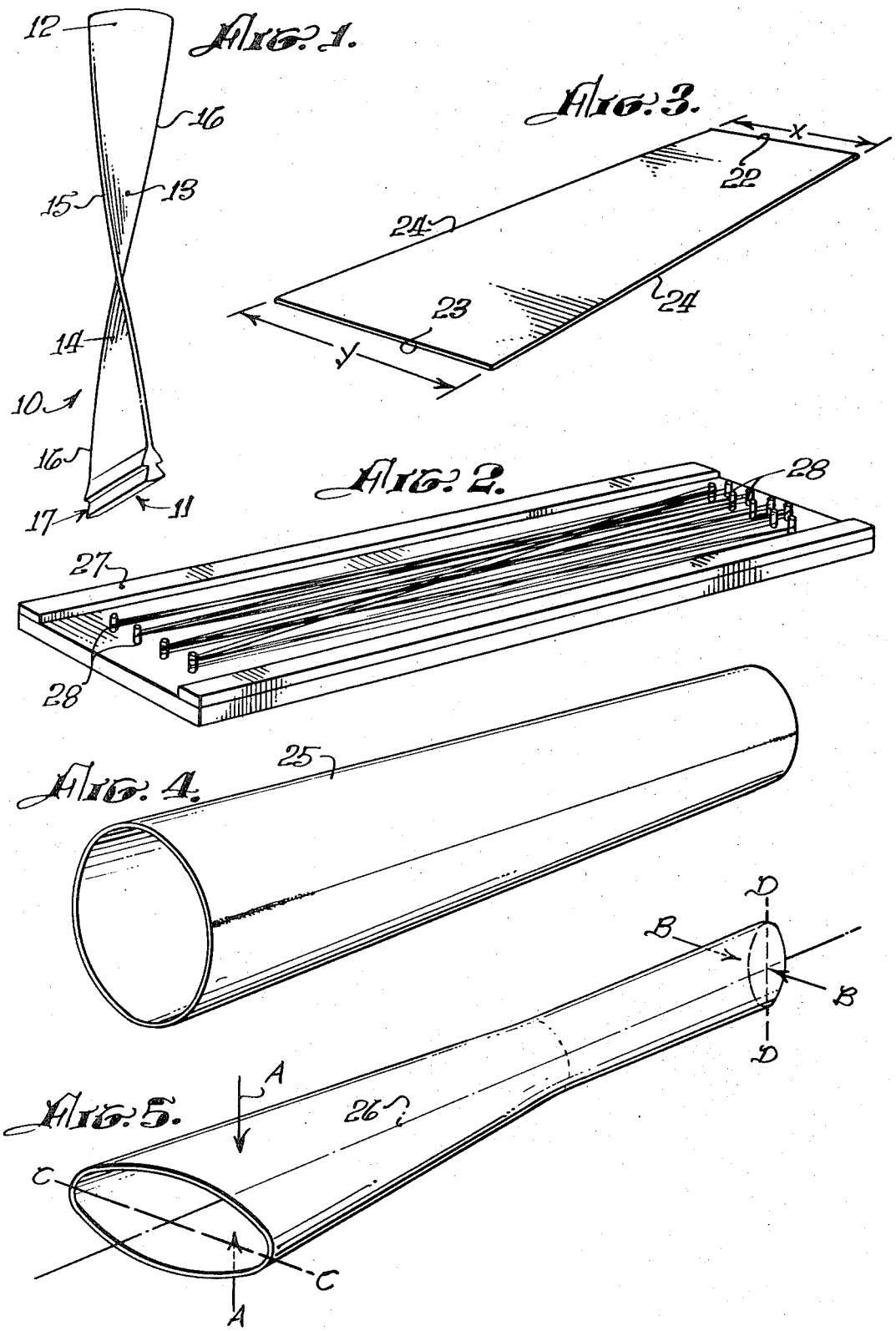

AIRFOIL AND METHOD OF FORMING THE SAME

This is a divisional of application Ser. No. 93,095 filed Nov. 27, 1970, now abandoned.

SUMMARY

This invention relates generally to airfoil devices and methods of manufacturing the same. The invention has particular utility with respect to blades for turbomachinery formed of materials which give the blades great strength, make them relatively vibration resistant, light in weight, and economical to produce in quantities. The invention further embraces a method of fabricating an article, such as an airfoil, herein illustratively described as a turbomachinery blade, from composite materials like plastic or resin-impregnated fibers and encasing such materials in a protective shell or skin and curing the plastic or resin to complete the unit.

An object of this invention is to provide an article such as an airfoil, and in particular a turbomachinery blade having an inner body composed of high strength fibers impregnated with resinous material, the method of forming the article effecting a high fiber to resin content in the inner body and a fiber filament arrangement to lend maximum strength.

Another object of the invention is to provide the method mentioned in the preceding paragraph with novel steps for the formation of a protective shell or skin for encasing the composite inner body, such steps enabling the production of an article with a certain required formation without reducing the strength of the material of the skin through the introduction of unusual stress or strain.

A further object is to provide a method of forming a protective shell or skin for a complete airfoil, for example, a turbomachinery blade, which includes the steps of cutting or shaping a piece of sheet material to a predetermined form, joining opposed edges of the sheet to form a hollow shell having at least one open end, applying pressing forces to predetermined points spaced longitudinally and circumferentially of the shell to preform same, inserting the composite inner body forming material, and pressing the preformed shell between complemental dies to impart the final form to the article.

A still further object is to insert sufficient inner-body-forming material into the preformed shell so that during the final pressing operation the excess resinous filler will be expelled from the ends of the shell whereby a high fiber to resin content of the inner body will remain and the strength of the article will thus be increased.

An object also is to provide the exemplary turbomachinery blade previously mentioned with a fir-tree type of hub end for securing the blade to the rotor or disk, the fir tree being formed by inserting wedge elements into the inner body to spread the fiber filaments and thus give the blade root the fir-tree shape and make it fit into a correspondingly shaped recess provided therefor in the rotor disk.

Other objects and advantages will be apparent from the following description of a blade embodying the invention and the method of forming the same illustrated in the accompanying drawings.

BRIEF DESCRIPTION OF THE DRAWINGS

FIG. 1 is a perspective view of a blade formed in accordance with the invention;

FIG. 2 is a similar view illustrating the filament winding step in the method of forming the blade shown in FIG. 1.

FIG. 3 is a perspective view showing a blank of sheet material trimmed to size and shape to start the formation of a protective shell for a blade;

FIG. 4 is a similar view illustrating the step of forming a hollow frusto-conical body from the sheet shown in FIG. 3;

FIG. 5 is also a similar view illustrating a shell preforming step.

Figure 6:
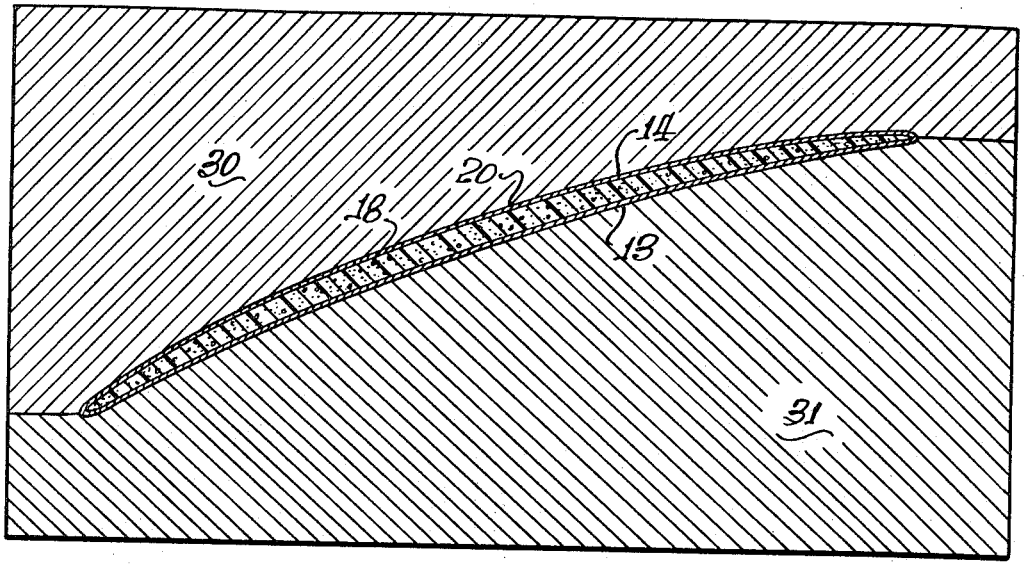
FIGS. 6 and 7 are sectional views taken through a die set in which the filled shell is pressed and held during the final forming and curing of the resin.

Particular reference to FIG. 1 of the drawings will show that the article selected to illustrate the invention is a blade 10 of airfoil shape which is suitable for use in a fan, a compressor, a turbine or other parts of a turbomachine, e.g., stator vanes. Blade 10 might be of many forms, the one illustrated having a hub end 11, a tip end 12, concave and convex sides 13 and 14, respectively, and leading and trailing edges 15 and 16. In this instance, the hub end 11 is formed with a fir-tree construction 17 commonly employed to retain blades on their supporting disks. As customary with blades designed for certain functions, blade 10 is twisted between the hub and tip ends in a manner which causes the surfaces adjacent such ends to face in angularly related directions, the degree of the angle depending, of course, upon the design of the blade and work to be done thereby. It should be noted that the directions in which the surfaces face may for convenience be considered in relation to the longitudinal axis of the blade.

Figure 7:
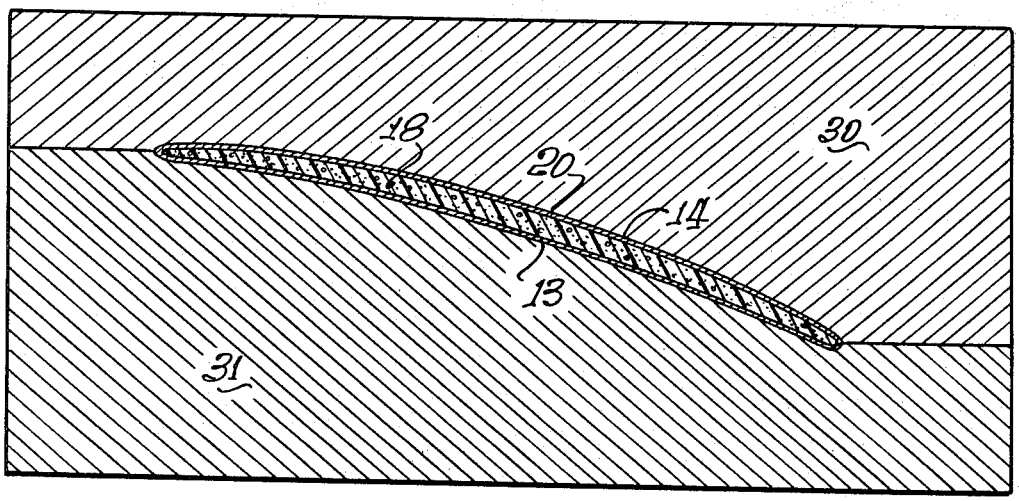

The present invention is directed to the structure of an airfoil, herein illustratively described as a blade, and the method of making it. The blade 10 has an inner body 18 (see FIGS. 6, 7 and 8) composed of fibers impregnated with a plastic, resin or other material which may be pressed into desired form and employed to cause the fibers to adhere to one another. The fibers are oriented to provide tensile strength in the direction of anticipated stress which typically, in turbomachinery rotor applications, will be longitudinally of the blades. Body 18 is encased in a shell or skin 20 of thin metal or other material which will protect the inner body from erosion, corrosion and foreign object damage. The skin 20 is of light gage in the foil range, for example, 0.005 inch, which will readily conform to the shape of dies or other pressing or forming equipment and yet will provide the end item with a smooth finish and ample strength.

In the manufacture of the blade 10, a blank 21 of sheet material, such as stainless steel, of suitable thickness is cut or otherwise suitably shaped to desired form. Size and shape will obviously depend upon the characteristics of the final article. In the blade shown, the width X of end 22 of blank 21 is slightly narrower than the width Y of end 23 since it will be used in the narrower hub end of the finished blade. After cutting the blank, it is coiled and the longitudinal or side edges 24 joined, as shown in FIG. 4, by a standing edge weld, to form a hollow shell 25 at least one end of which is open. The excess material, if any, of the edges is burned off or otherwise removed to make the thickness uniform and the outer surface smooth. Frequently in the makeup of turbomachinery blades the shell is of the illustrated frusto-conical shape. However, the shell may take other shapes. For example, it may be cylindrical and in certain instances will be of generally hourglass shape with a waisted portion. Furthermore the shell need not necessarily be of circular cross-sectional shape although in many cases this is desirable.

Following the joining of the edges 24 to make the hollow body or shell 25 it is preformed by partially collapsing it adjacent the ends or other location through the application of opposed forces as indicated by arrows A—A and B—B in FIG. 5. It will be noted from this figure that the lines of forces A—A and B—B are relatively rotated about the longitudinal axis 26 of the body depending upon the degree of turn in the final blade. This preforming, in the blade illustrated, provides the body with oval configurations having the longer axes thereof also angularly disposed about the axis of the body. This preforming step is accomplished so that the twist in the final blade can be secured without actually twisting the sheet or foil material which would introduce unusual stress or strain therein even to the extent of wrinkling or tearing the material.

After the body 25 is preformed, there is inserted thereinto a mass of inner-body, forming material consisting of glass or other suitable fibers would in a predetermined pattern, these fibers being previously impregnated with a plastic or synthetic resin selected for its ability to bond the fibers and the skin into an integral unit when it is cured. The quantity of resin impregnated fibers is so calculated that in a subsequent pressing operation excess resin will be extruded from the open ends of the body leaving a high ratio of fiber to resin in the finished blade. This end is desired since the fibers play the major role in providing the blade body with the requisite physical properties. Thus, when oriented, as illustrated, longitudinally of the embracing shell 25, the fibers provide the blade with high tensile strength and resistance to elongation in use.

The inner-body-forming material is prepared by winding the fiber rovings in a predetermined manner on a suitable frame 27. This frame may have pins 28 arranged adjacent each end around which the fiber strands are passed and repassed until a suitable pattern has resulted. The strands may have previously been or then be impregnated with the selected plastic or resin prior to removal from the frame and insertion into the body or shell 25. They may also be wound under tension or tension may be applied to the ends of the windings after they have been inserted into the body.

Following the insertion of the fibers the body or shell 25 is placed between forming die sections 30 and 31 which are employed to press the preformed skin and inner body into final shape. These die sections are suitably heated, where required, to render the resin plastic and susceptible to forming and plastic flow. A comparison of FIGS. 6 and 7 will show the previously mentioned angular relation of the portions of the blade therein. This configuration will be facilitated by the preforming step without actually twisting the sheet material of the skin.

The shell with the resin impregnated fibers contained therein floats or self-orients to the interior of the forming die sections 30 and 31. Since the shell is open at least at one end, the resin flows therefrom as the dies press upon the shell exterior. The shell thus acts as a form limiting die or shape for the body material and the result is an increase in the fiber-to-resin content of the body and a more compact arrangement of the fibers. By utilizing the shell as a limiting die there is eliminated any need to cut, trim, grind, polish or otherwise shape the composite article after forming and curing. This presents an integral body surface, devoid of the microcracks in the resin which could otherwise be anticipated were such shaping operations necessary. After this pressing and shaping step the resin is appropriately cured, which may and frequently does involve heating of the die sections 30 and 31.

Figure 8:
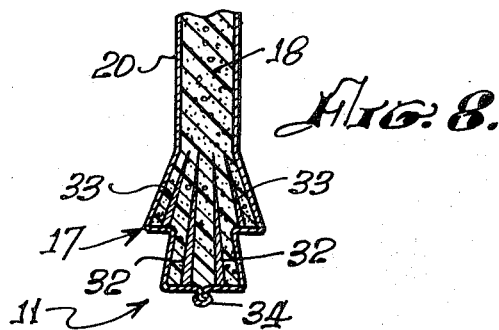
FIG. 8 is an axial sectional view taken through the hub end of a completed blade.

These die sections may also be provided with portions to impart the fir-tree configuration 17 to the hub end of the blade as shown in FIG. 8. This result may be secured by inserting wedge-shaped inserts 32 and 33 into the inner body forming materials either before or during the blade pressing operation. The inserts may be of suitable material to cause the fibers to spread and fill the recesses in the die whereby the fir-tree shape will result. As heretofore indicated, during the pressing operation the dies may be heated in any suitable manner to soften and cure the plastic or resin. This curing operation may also cause the adhesion of the skin to the inner body as well as the fibers to one another to provide an integral unit. The resistance of the illustrated blade to elongation is improved if the fiber strands are maintained in tension during the curing operation. Each end of the blade shell may be closed in a suitable manner as at 34 after the forming and fiber end trimming operations have been completed.

By the foregoing steps a novel turbomachinery blade or other airfoil may be produced. The article will be light and strong, will resist vibration and fatigue resulting therefrom and be highly resistant to erosion, corrosion and foreign object damage, and can be readily duplicated by mass production methods.

Although this invention has been described with respect to a particular embodiment thereof, it is to be understood that other embodiments of this invention may be made without departing from the spirit and the scope of the claims hereinbelow.

I claim:
1. A method of forming an airfoil comprising the steps of:
 a. providing an erosion resistant shell blank of predetermined size and shape;
 b. joining a pair of opposed edges of the blank to form a hollow shell with at least one open end;
 c. inserting fiber strands in the shell oriented generally along the longitudinal axis of the shell;
 d. inserting a mass of body forming material in the shell, said mass surrounding and impregnating the fiber strands;
 e. pressing the shell between a plurality of elements of predetermined shape whereby the shell acts as a form-limiting die and excess body material is squeezed out the open end of the shell;
 f. curing the airfoil to fix the shape and integrally bond together the fiber, shell and body.

2. The method of claim 1 in which the shell blank is shaped to give the hollow shell a cross-sectional shape which is substantially circular over a major portion of the shell length.

3. The method of claim 2 in which the hollow shell is preformed before the fiber strands and body forming material are inserted therein to provide substantially reduced cross sections at a plurality of axially spaced regions, the reduced being accomplished by applying forces to the shell at different relative angular positions about the longitudinal axis of the shell.

4. The method of claim 1 in which the opposed edges of the blank are joined by a standing edge weld and the excess metal is removed to provide a uniform thickness and smooth exterior surface.

5. The method of claim 1 and further comprising the steps of:
 a. applying tension to said fiber strands;
 b. maintaining said strands in tension while the airfoil is being cured.

6. The method of claim 1 in which the fiber strands are pre-tensioned prior to insertion in the shell.

7. The method of claim 1 in which the fiber strands are tensioned after insertion in the shell.

8. The method of claim 5 in which the shell is shaped to give the hollow shell a cross-sectional shape which is substantially circular over a major portion of the shell length.

9. The method of claim 5 in which the hollow shell is preformed before the body forming material is inserted therein to provide substantially reduced cross sections at a plurality of axially spaced regions and at different relative angular positions about the longitudinal axis of the shell.

* * * * *